(12) United States Patent
Omundson et al.

(10) Patent No.: US 6,357,769 B1
(45) Date of Patent: Mar. 19, 2002

(54) INDEPENDENT REAR SUSPENSION SYSTEM

(75) Inventors: John P. Omundson, Manitowoc; Mark E. Gerisch, Two Rivers, both of WI (US)

(73) Assignee: Mosler Auto Care Center, Inc., Riviera Beach, FL (US)

( * ) Notice: Subject to any disclaimer, the term of this patent is extended or adjusted under 35 U.S.C. 154(b) by 0 days.

(21) Appl. No.: 09/668,816

(22) Filed: Sep. 23, 2000

Related U.S. Application Data

(63) Continuation of application No. 09/062,861, filed on Apr. 20, 1998, now abandoned.
(60) Provisional application No. 60/063,928, filed on Oct. 31, 1997.

(51) Int. Cl.[7] ............................................. B62D 21/00
(52) U.S. Cl. .............................. 280/124.109; 180/312; 180/360; 280/124.156; 280/798; 280/781
(58) Field of Search ................................. 180/312, 353, 180/354, 359, 360; 280/124.109, 124.135, 124.143, 124.145, 124.156, 124.162, 781, 785, 787, 788, 798

(56) References Cited

U.S. PATENT DOCUMENTS

| | | | |
|---|---|---|---|
| 781,990 A | 2/1905 | Ball, Jr. ........................ 180/56 |
| 792,561 A | 6/1905 | Thompson ................. 180/70 R |
| 1,312,993 A | 8/1919 | Keesler | |
| 1,448,133 A | 3/1923 | Larson ........................ 180/299 |
| 1,962,937 A | * 6/1934 | Richman ..................... 180/58 |
| 2,005,838 A | 6/1935 | Bartlett .................... 280/106.5 |
| 2,169,916 A | 8/1939 | Keeler ........................... 180/1 |
| 3,115,945 A | 12/1963 | Dry et al. ..................... 180/56 |
| 3,362,498 A | 1/1968 | Allison ........................ 180/73 |
| 3,583,725 A | * 6/1971 | Fry ...................... 280/124.135 |
| 3,598,422 A | * 8/1971 | Strauff ........................ 280/124 |
| 3,709,516 A | * 1/1973 | Ewert ......................... 180/360 |
| RE28,675 E | 1/1976 | Hobbensiefken ............. 180/11 |

(List continued on next page.)

FOREIGN PATENT DOCUMENTS

| | | | |
|---|---|---|---|
| DE | 296 15 488 | 1/1998 | ........... B62D/21/20 |
| WO | 96/00661 | 1/1996 | ............ B60G/3/20 |

OTHER PUBLICATIONS

Non–Patent Document.

Primary Examiner—J. J. Swann
Assistant Examiner—Christopher Bottorff
(74) Attorney, Agent, or Firm—Boyle Fredrickson Newholm Stein & Gratz S.C.

(57) ABSTRACT

A vehicle suspension system for mounting to a vehicle chassis includes a subframe which includes two tubular members. Each tubular member has a rear chassis mount and front chassis mount. The tubular member mounts are constructed and arranged to mount to a leaf spring mounting perch on the vehicle chassis. The tubular members are connected by a plurality of cross braces which in turn are connected to a plurality of intermediate tubes. A differential mount connects to a cross brace which is connected to a tubular member. An upper control arm mount and a lower control arm mount connect to intermediate tubes which are connected to a cross brace which in turn is connected to another cross brace. This all connects to at least one tubular member. A self-contained suspension assembly mounts to the subframe at various places. For example, a differential mounts to the subframe at the differential mount and a pair of half-axle shafts connect to the differential. A cv joint connects to each half-axle shaft and a cv boot covers each cv joint. A spindle assembly connects to each cv joint. The subframe may further comprise an anti-roll bar connected to the subframe. The vehicle suspension system also may have an adjustable cushioning system connected to the half-axle shafts for restricting movement of the half-axle shafts. The cushioning system may include coil-over-spring shocks and/ or air springs. A disc brake system may also be included.

50 Claims, 9 Drawing Sheets

U.S. PATENT DOCUMENTS

| | | | |
|---|---|---|---|
| 3,966,223 A | * 6/1976 | Carr | 280/124.128 |
| 4,159,126 A | 6/1979 | Raleigh | 280/688 |
| 4,341,397 A | * 7/1982 | Morimura et al. | 280/124.106 |
| 4,355,844 A | 10/1982 | Muzzarelli | 296/205 |
| 4,364,582 A | * 12/1982 | Takahashi et al. | 280/124.106 |
| 4,660,345 A | 4/1987 | Browning | 52/648 |
| 4,712,638 A | * 12/1987 | Kawaguchi et al. | 180/219 |
| 4,768,274 A | 9/1988 | Pinnow et al. | 29/401.1 |
| 4,786,074 A | 11/1988 | Muramatsu | 280/690 |
| 4,817,985 A | 4/1989 | Enokimoto et al. | 280/690 |
| 4,821,827 A | 4/1989 | Reese | 180/61 |
| 4,826,203 A | 5/1989 | Kijima et al. | 280/690 |
| 4,906,018 A | 3/1990 | Kijima et al. | 280/690 |
| 4,924,961 A | * 5/1990 | Bernardi | 280/787 |
| 4,963,759 A | * 10/1990 | Leonti et al. | 280/124.143 |
| 5,240,279 A | 8/1993 | Kunert | 280/673 |
| 5,259,661 A | 11/1993 | Thum | 296/204 |
| 5,280,957 A | * 1/1994 | Hentschel et al. | 280/788 |
| 5,362,091 A | 11/1994 | Lee | 280/662 |
| 5,427,404 A | * 6/1995 | Stephens | 280/124.162 |
| 5,562,308 A | 10/1996 | Kamei et al. | 280/788 |
| 5,577,571 A | 11/1996 | Rizzoli | 180/299 |
| 5,782,139 A | * 7/1998 | Fraiman | 74/551.1 |
| 5,791,431 A | * 8/1998 | Asao et al. | 180/311 |
| 6,099,039 A | * 8/2000 | Hine | 280/781 |

* cited by examiner

INDEPENDENT REAR SUSPENSION SYSTEM

CROSS-REFERENCE TO RELATED APPLICATIONS

This application is a continuation of U.S. patent application Ser. No. 09/062,861, filed Apr. 20, 1998 now abandoned and claims the benefit of provisional application, application Ser. No. 60/063,928 filed Oct. 31, 1997.

BACKGROUND OF THE INVENTION

1. Field of the Invention

The present invention relates to a suspension system for a vehicle. More particularly, the invention relates to an independent rear suspension (IRS) system having a tubular subframe which is capable of mounting directly to a vehicle chassis, thus improving ride comfort and handling safety. At the same time, the suspension system is completely self-contained so that a novice mechanic can easily install it.

2. Description of Related Art

The suspension system of a vehicle connects the axle shafts and the vehicle body to each other. The suspension also controls a position of a tire with respect to the vehicle body for its ideal position during the running of the vehicle, and thus obtains optimal handling safety. It also prevents the axle shaft from directly transmitting an impact or vibration from the road surface to the vehicle body, and in this way prevents damage of the vehicle cargo and improves the ride comfort of the vehicle passengers. Accordingly, the connection of the upper and lower portions of the vehicle's suspension generally is made to be flexible to absorb the impact from the road surface and durable to overcome a driving force, a braking force, and a centrifugal force applied to the vehicle's wheels.

Such suspensions described above can be variably classified according to the characteristics of their structures. For example, many vehicles are manufactured with an independent rear suspension (IRS). Two types of IRS systems are common: the trailing arm suspension and the short arm/long arm rear suspension. Most of these IRS systems No include an elongated strut as part of the suspension and a shock or strut tower which forms a portion of the vehicle body. For example, the shock tower or strut tower extends into the trunk of a typical passenger automobile occupying some of the cargo space within the trunk, but otherwise does not interfere with the operation of the trunk. Items can be placed in the trunk of a passenger vehicle on the sides of and around the shock tower with little or no problem. Since the automobile strut typically inclines toward the center of the vehicle, the shock tower not only extends upwardly into the trunk, but laterally into the trunk as well.

It has been found that independent rear suspensions offer many dramatic performance advantages over regular live-axle configurations. The main advantage is that each wheel is able to react to the conditions it is facing without transmitting its motion to the car or to the other wheel. This significantly improves the handling of the vehicle. The wheels hold their alignment better, which can improve braking and acceleration on uneven surfaces. The vehicle has more ground clearance, because the differential is raised and being independently sprung allows the half-shafts and control arms to accept a greater angle. IRS-equipped vehicles corner better because there is less weight shifting as the body tilts into the corner.

Thus, the concept and implementation of IRS is nothing new. In fact, luxury automobiles, racing cars, and custom hot-rods have had them for years, and the designs have become more refined and sophisticated over time.

Until recently, trucks were considered only to be utility vehicles. Trucks were used to move loads or drive through rough terrain. If a truck was driven for recreation, it was off road or on rough terrain, not for cruising, high speed racing, or long distance driving.

However, now that trucks are becoming luxury and recreational vehicles, ride smoothness and handling are more important issues to truck buyers. Further, now that trucks come with luxury interiors and class A exteriors, a ride to match would be desirable.

Several patents relate generally to prior art independent rear suspensions and to vehicle suspensions in general, for example, U.S. Pat. No. 3,362,498 to W. D. Allison, U.S. Pat. No. 4,768,274 to Pinnow, Norris, and Benedict, U.S. Pat. No. 4,817,985 to Enokimoto, et al., U.S. Pat. No. 5,240,279 to Kunert, and U.S. Pat. No. 5,362,091 to Lee.

While several of these patents relate generally to suspension assemblies and independent rear suspensions, as well as suspension strut assemblies, none of the above-mentioned patents teach a tubular subframe for holding a suspension assembly which is mounted directly to a mounting perch for a leaf spring on a standard vehicle chassis. Also, none relate to a suspension conversion system that includes a free-standing, self-contained suspension system including an air cushioning system that can at times accommodate heavier cargo loads within the vehicle while not interfering with normal passenger comfort, handling and operation of the vehicle and a disc brake system.

Therefore, what is needed is a suspension system that is the next evolution, one that is an easy-to-install suspension and one that makes it possible for a truck or sport utility vehicle to have a fully independent suspension. What is also needed is a suspension system that provides that smooth, comfortable ride.

SUMMARY OF THE INVENTION

The suspension according to the present invention relates to a rear suspension, more specifically, to an independent rear suspension which is provided with a subframe and an attached self-contained rear suspension assembly.

The present invention also relates to vehicle conversions and more particularly relates to a method for converting a truck or other vehicle body having chassis rails and a rear suspension comprised of original equipment manufacturer leaf springs to a vehicle having a suspension with a subframe and an adjustable rear suspension assembly which is designed to provide a smooth transition from hauling heavy cargo to carrying passengers comfortably.

The present suspension system relates generally to a tubular replacement suspension system for original equipment manufacturer (OEM) rear suspensions and uses at least one of the mounting perches of the OEM leaf springs. The inventive suspension system is free-standing and self-contained, which means it is a complete rear suspension replacement package for passenger automobile and truck applications, including axles, control arms, cushioning systems, hub assemblies, and brake assemblies. The invention's tubular design mounts to any chassis, load, and wheel configuration. Moreover, while most prior art rear suspension assemblies have a dozen or more bolts attaching it to the chassis, it is relatively simple to remove an old suspension system and install the suspension system of the present invention, generally by attaching just four bolts to the existing chassis and four bolts to the existing differential.

The inventive suspension system consists of a complete suspension system including: a tubular subframe, upper and lower control arms, a differential, half-axles, toe adjustment rods, shocks, springs, and other related parts. In the preferred embodiments, a disc brake system is available to upgrade from drum brakes. Since the system is totally self-contained, it is calibrated appropriately so that all the user needs to do is attach the inventive suspension system to the vehicle to be ready to go. This may be accomplished in as little as an afternoon's work.

There are two main embodiments of the inventive suspension system. The first is a high performance sport embodiment and the second is a standard embodiment. The standard embodiment is made from mild steel tubular members and generally fits on utility trucks, passenger and sport utility vehicles. In the high performance embodiment, the tubular members may be made from a metal matrix composite alloy made from aluminum and boron and sold under the trade name BORALYN®, or other composite materials, like carbon fiber or similarly related fabric materials. These composite materials give the tubular members better performance and strength, as well as a sportier look.

The inventive system consists of a subframe made up of a multitude of tubular members. The subframe mounts to the existing leaf spring mounting perches on the rails of a standard vehicle chassis. In the preferred embodiments, the subframe may be constructed of oval or rectangular tubular members, however, generally any member of any geometric shape may work. For example, the various embodiments may have square or rectangular tubular members. The two tubular members are linked together by an internal subframe structure which is constructed of cross braces and intermediate tubes made of generally round metal tubes. These cross braces and tubes are preferably welded together.

A differential is attached to the cross braces of the subframe via a pair of differential mounts. Upper and lower control arms connect to mounts or mounting ears attached to the intermediate tubes and cross braces of the subframe.

The actual cushioning elements of the suspension assembly may use various configurations of push rods and/or rocker arms activated coils-over-shocks and/or air springs. Shocks and/or push rods may mount to the lower control arm. The shocks may utilize a coil-over-spring and an air spring on the heavy-duty models. In the case of a push rod, it pivots on a rocker, pushing against the shock to its anchor. The coil-over-spring and/or air spring takes over the stabilizing function of a torsion bar, eliminating the complexity and extra parts the torsion bar may require.

An anti-roll bar may mount from lower control arms to the subframe, and may be either a bar style or an adjustable tube and/or blade configuration (race style). A spindle/knuckle mounts to the control arms via bushings or ball joints. Drive shafts (i.e. half-axle shafts) mount from the differential to the drive flange on a knuckle utilizing universal joints or constant velocity joints.

The system may also include a disc brake system including, a master cylinder, metering block, portioning valve, calipers, rotors and associated hardware for upgrading the rear brakes. Most drum brake systems do not fit with the inventive suspension system, and therefore, these existing systems may need to be replaced. For the high performance model, high performance disc brake assemblies such as the assemblies found on 1997 DODGE® VIPER® model cars may be supplied. The 4×4 model has either disc brakes like the ones found on 1997 FORD® THUNDERBIRD® model cars or brakes which can be purchased from after-market companies. The brakes mount to the upright or knuckle and the rotors mount to the drive flange opposite the U-joints or constant velocity (cv) joints. Tires and wheels mount to the drive flange via lug studs.

The subframe, cross braces, control arms, anti-roll bar, and linkages (if used) are custom-engineered components. The remaining components including differential, half-shafts, main drive shaft, knuckle/drive hub assembly, rear toe adjustment, and disc brake system are over-the-counter, stock components. The high performance model incorporates a differential, brake system, and the spindles/steering knuckle found on 1997 DODGE® VIPER® model cars. However, the 4×4 standard model uses the 9 inch, 8.8 inch or DANA® 44, 60 or 70 series gear differential found on 1997 FORD® trucks.

Again, the suspension system of the present invention can be easily attached directly to the existing chassis of the vehicle. None of the prior art suspensions are mounted to a subframe that bolts directly into the chassis using the factory given suspension leaf spring mounting perches.

Moreover, the inventive suspension assembly bolts into the subframe and is a complete unit which is self-contained and free-standing. This system includes properly calibrated and designed shock mounting areas, suspension pick up points and rear end carrier points. None of the prior art systems are self-contained, free-standing and functional on their own as is the inventive suspension system.

In summary, the inventive suspension system is unique because of: 1) its tubular structure, 2) the fact that it is also a complete unit which is self-contained and free-standing system and which does not rely on any surrounding structures to mount itself other than original chassis leaf spring mounting perches, and 3) the fact that all the system's moving components including adjustable shock absorbers, springs, upper and lower control arms, links, disc brake system and all adjacent parts are a part of this self-contained system and do not rely directly on the original chassis to properly function.

It is the object of the invention to create a tubular vehicle suspension system that is a complete unit that is self-contained inside a subframe that bolts directly to a vehicle's chassis using the factory-given suspension leaf spring mounting perches.

It is an object of the present invention to improve a vehicle's conversion from hauling cargo loads to carrying passengers.

It is another object of the present invention to improve general vehicle chassis stiffness and handling.

It is yet another object of the present invention to make the rear of any vehicle fully independent, giving that vehicle the ride and handling qualities of luxury cars.

It is still another object of the present invention to improve vehicle ground clearance and suspension travel.

Still another object of the present invention to increase the ease of installation by having suspension systems specifically designed and calibrated for each brand and model of vehicle.

It is yet another object of the present invention to reduce a vehicle's unsprung weight and tire wear.

BRIEF DESCRIPTION OF THE DRAWINGS

The drawings illustrate the best mode presently contemplated for carrying out the invention.

In the drawings.

DESCRIPTION OF THE PREFERRED EMBODIMENTS

FIGS. 1–9 illustrate a vehicle suspension system 22 for mounting to a vehicle chassis 5 in accordance with some of the embodiments of the present invention. The system 22 is an independent rear suspension system, although with modifications one skilled in the art will appreciate that the suspension system could be changed to fit the front of the vehicle or modified to include a non-independent system. The suspension system 22 can also be used with nearly any vehicle, but is primarily designed for vehicles that have a chassis with rails, for example, sport utility vehicles, 1 ton, ½ ton, ¼ ton, 4×4, 4×2 trucks, and pick-up trucks with dual rear wheels (commonly known as "dualies").

Figure 1:
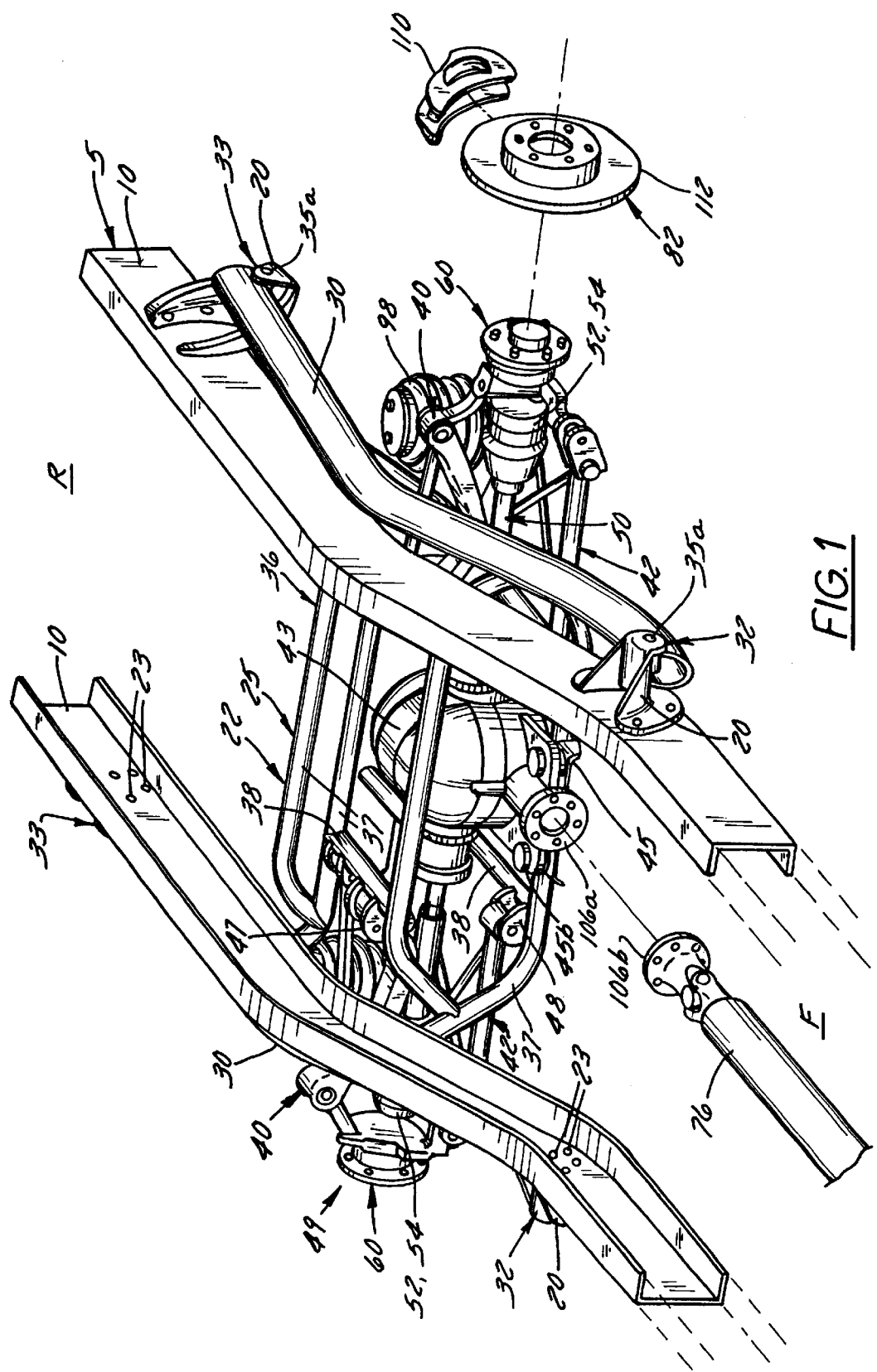
FIG. 1 is a isometric view of the suspension system mounted to a vehicle chassis looking from the front of the vehicle to the rear.

As shown in FIG. 1, a truck or sport utility vehicle chassis 5 generally includes a pair of rails 10 that run longitudinally from the front end (F) of the vehicle to the rear end (R) of the vehicle. A plurality of holes 23 for mounting leaf spring mounting perches 20 for a rear suspension are generally bore through the rails 10 in one or more places toward the rear end (R) of the vehicle. A front of the leaf spring system (not shown) mounts on front mounting perches and a rear mounts on rear mounting perches. Generally, these perches 20 hold the leaf spring system together and are bolted into the holes 23 in the rails 10.

The vehicle suspension system 22 of the present invention includes a subframe 25 which has a front and a rear relative to the front end (F) and rear end (R) of the vehicle. In the preferred embodiment, the subframe 25 is formed from preferably two generally S-shaped oval tubular members 30. However, the members 30 can be of any geometry, for example square, rectangular or round stock (e.g. see FIG. 9). In the preferred embodiments oval or rectangular tubular stock was selected because their cross-sectional areas allow them to mount very close to the vehicle chassis 5 thus reducing wheel interference. An oval or a rectangular shape also gives the member superior strength as compared to most other geometries and allows the generally S-shaped members 30 fit the contour of most chassis allowing for a tighter, and more aesthetic fit for the tubular members. However, the tubular members can be formed in a shape to fit any chassis contour. For example, while some chassis have a generally S-shaped contour other chassis have a generally C-shaped contour and thus would preferably have C-shaped tubular members attached.

Figure 3:
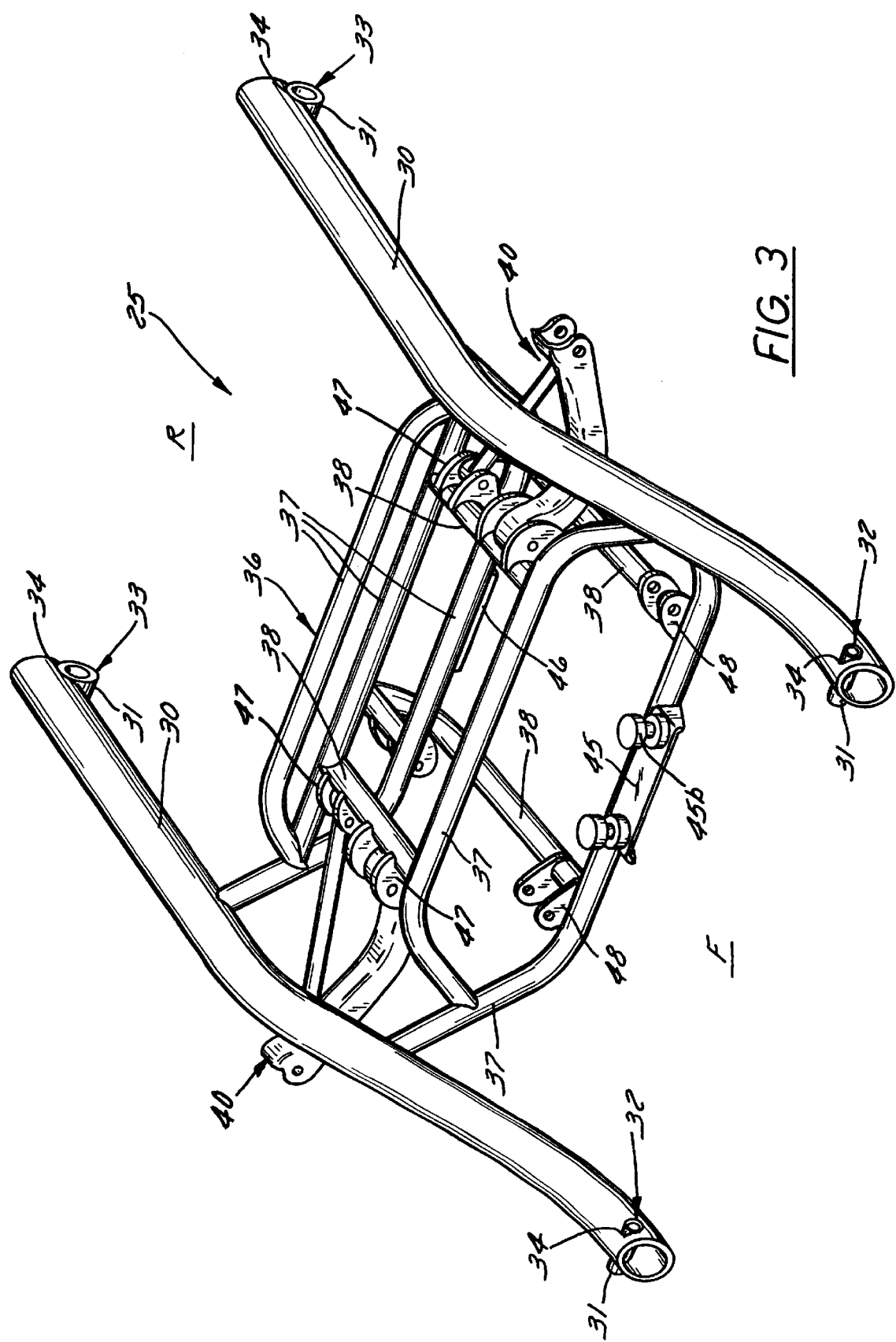
FIG. 3 shows an isometric view of the subframe shown in FIG. 2 looking from front to rear.
Figure 4:
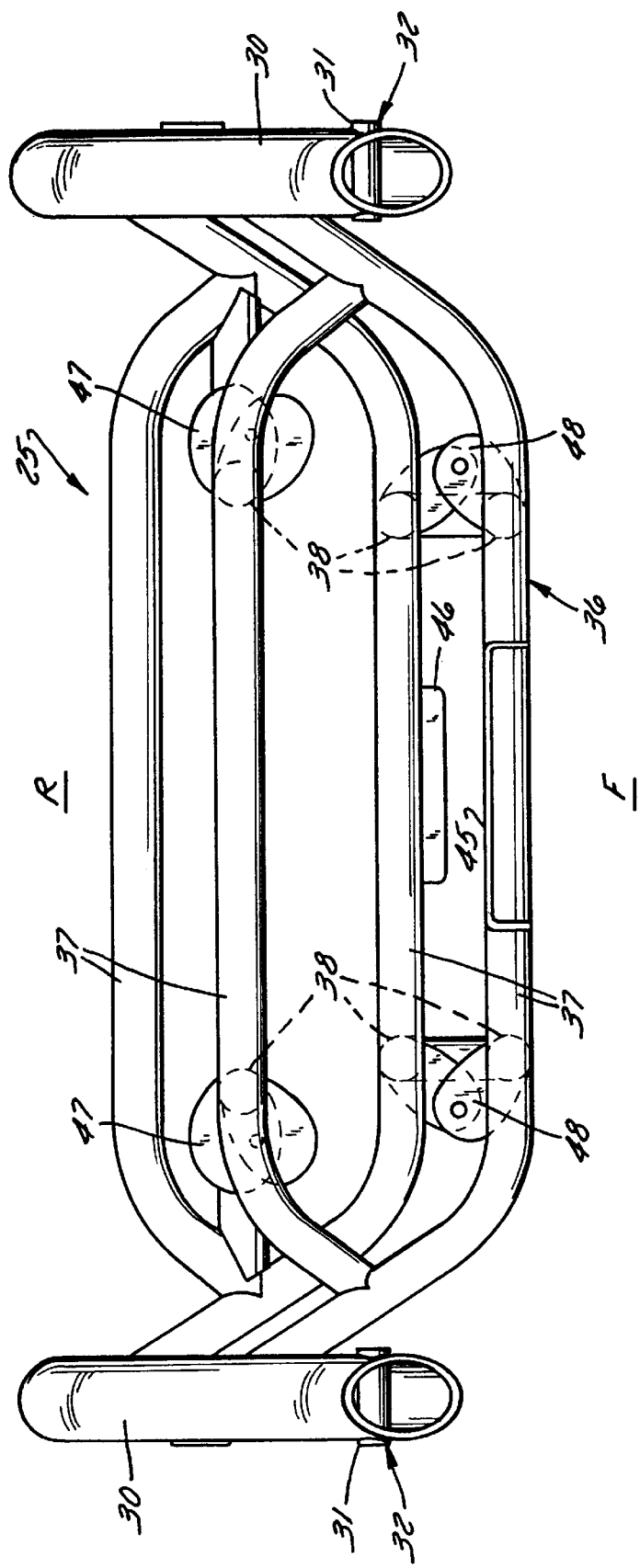
FIG. 4 is a front view of the subframe shown in FIG. 2.
Figure 5:
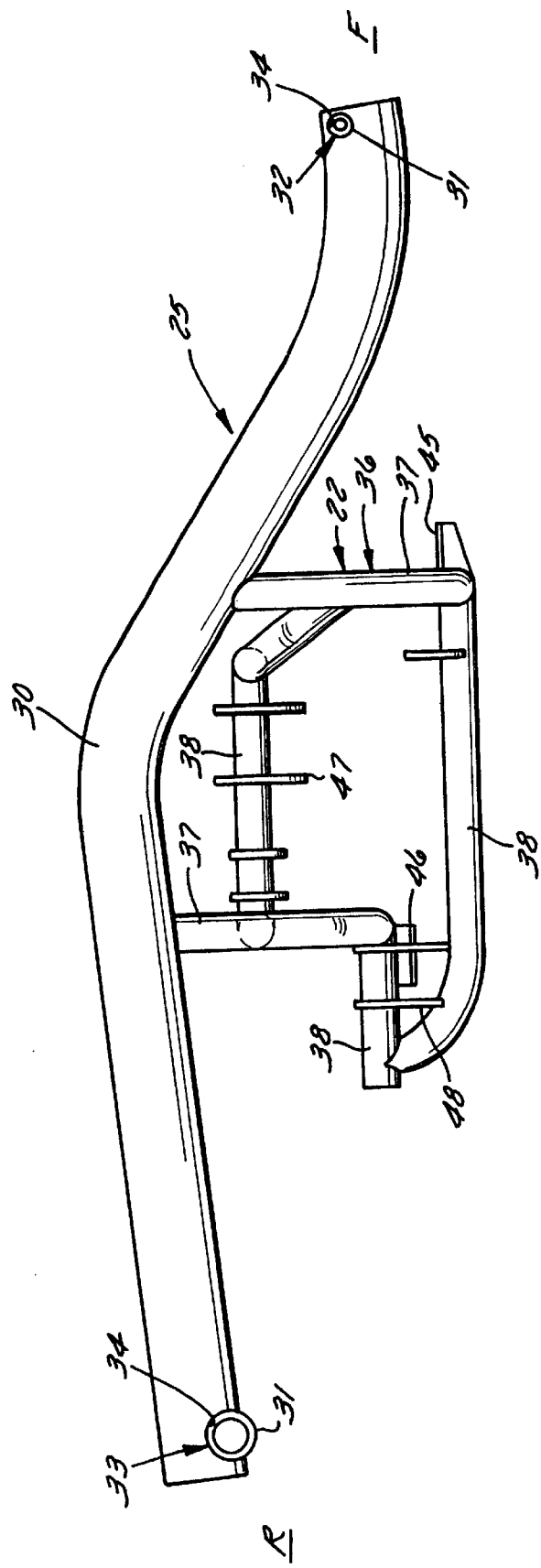
FIG. 5 is a right side view of the subframe shown in FIG. 2.

As shown in FIG. 3, each tubular member 30 has a front chassis mount 32 and a rear chassis mount 33, again these front and rear mounts are relative to the front (F) and the rear (R) end of the vehicle and subframe 25. In the preferred embodiment, these mounts consist of: holes 34 bore through the oval or rectangular tubular member 30, and small tubes 31 inserted into holes 34 and welded to each tubular member 30 (best seen in FIGS. 3 and 5). Referring now to FIG. 1, the mounts 32, 33 are then attached to the rails 10 of the vehicle chassis 5 by using the original equipment manufacturer (OEM) leaf spring mounting perches 20 normally used for mounting standard leaf springs (not shown). The front mounts 32 connect to the front perches and the rear mounts 33 connect to the rear perches. No additional drilling, welding, or cutting is required to make the inventive suspension system 22 fit properly into the vehicle. Alternatively, it may be necessary to utilize only one of the leaf spring mounting perches 20 with some vehicles such as the 1998 FORD® EXPEDITION® model.

Figure 6:
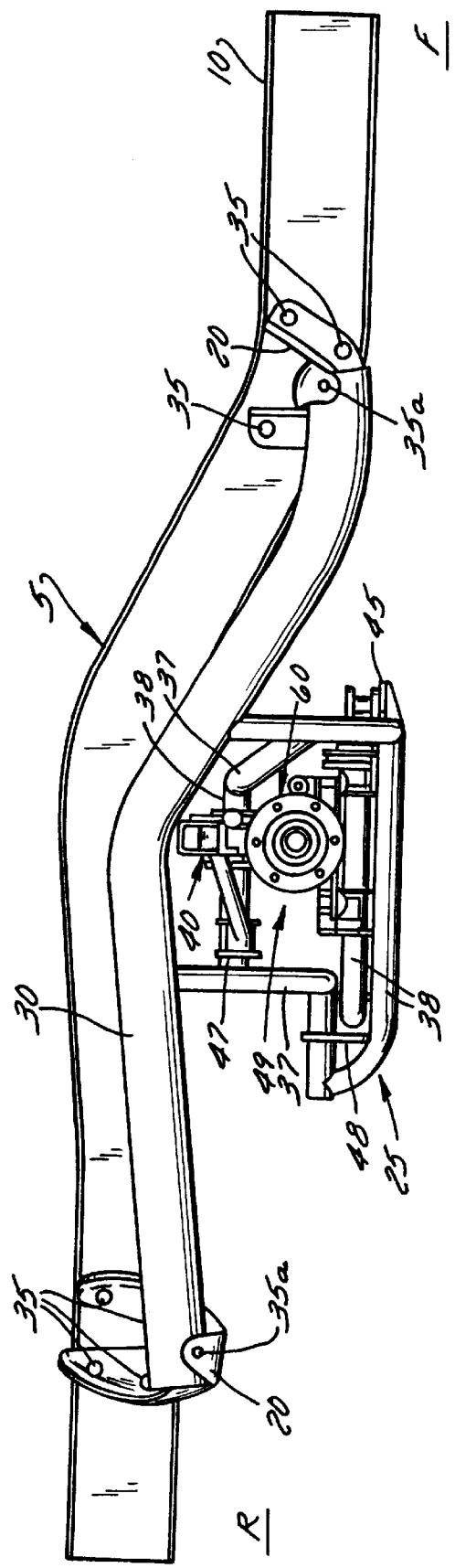
FIG. 6 is a right side view of the suspension system of FIG. 1 with parts removed for clarity.

As shown in FIG. 6, in the preferred embodiment, the leaf spring mounting perches 20 are rigidly connected by bolts 35 to the rails 10 of the chassis 5. Another bolt 35a is then inserted into each of the small tubes 31 in each tubular member 30 to secure the tubular members 30 to the mounting perches 20.

Figure 2:
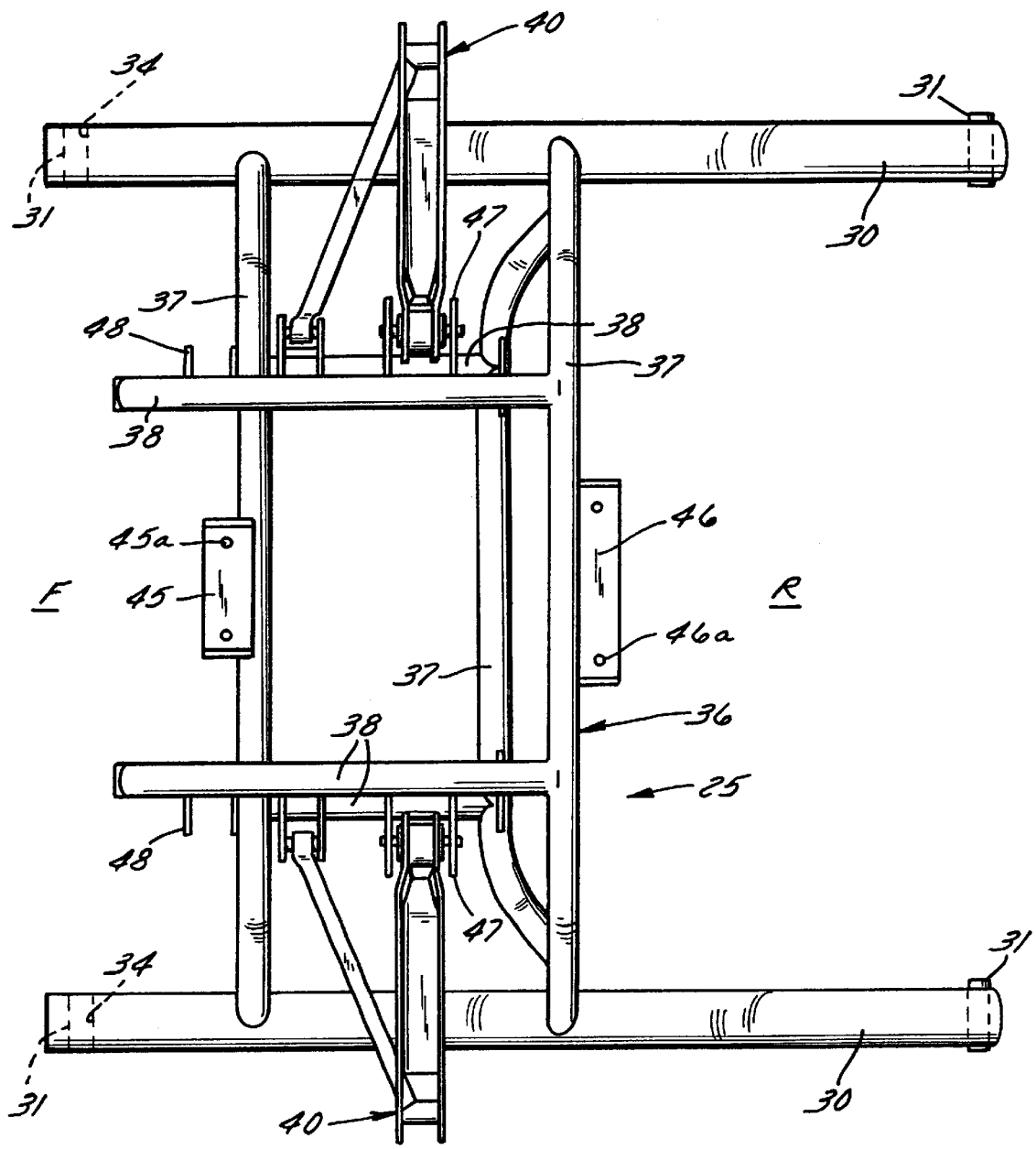
FIG. 2 is a bottom view of the subframe with the suspension assembly removed.

As shown in FIGS. 2 and 3, a preferably round tube internal subframe structure 36 is between the tubular members 30 and connects the tubular members 30 to each other forming a cage-like structure constructed from a plurality of two basic structural components, cross braces 37 and intermediate tubes 38. The structural components may be formed from a metal matrix composite alloy, such as that sold under the trademark BORALYN®, steel or any similarly strong, sufficiently strong, rigid, durable material such as a composite material for example, a fabric laminated material like carbon fiber. The tubular members 30, cross braces 37, and intermediate tubes 38 are rigidly connected together, preferably by welding or bonding. The tubular members 30 are preferably constructed from an oval tube about 3.5" by about 2.5" with a wall thickness of about 0.93" or a rectangular mild steel tubing about 4" by about 2" having a 0.120" wall thickness.

There are two main embodiments of the inventive suspension system: a high performance sport embodiment and a standard embodiment. The standard embodiment is preferably constructed from mild steel tubular members 30 and fits on 1 ton, ½ ton, ¼ ton, 4×4 and 4×2 utility and off-road trucks, dualies, sport utility vehicles, and other vehicles. The high performance embodiment may be preferably constructed completely from BORALYN®, another metal matrix alloy or a carbon fiber composite for better performance and strength, as well as a sportier look. The high performance embodiment is intended for 4×2 sport trucks.

Referring to FIG. 2, the subframe 25 also contains differential mounts 45, 46. The differential mounts 45, 46 consists of a front 45 and rear mounting plate 46 made from sheet steel or another sufficiently strong, hard, durable material. Although differential 43 (shown in FIG. 1) may be connected to the oval or rectangular tubular members 30 in any of several ways, in the preferred embodiments the differential mounts 45, 46 are first welded or otherwise affixed to the round tube cross braces 37 which make up the round tube internal subframe structure 36. These cross braces 37 are then connected to the oval or rectangular tubular members 30. Each differential mounting plate 45, 46 has holes 45a, 46a therein for receiving bolts, e.g. 45b (shown in FIG. 3), which tightly clamp the differential 43 in place.

As best seen in FIG. 3, at least one upper control arm 40 is connected to the subframe 25 by upper control arm mount 47. In the preferred embodiments, there are two upper control mounts 47 that are formed from a pair of mounting ears cut out of sheet steel. The mounts 47 or mounting ears are welded to an intermediate tube 38 which is connected preferably by welding to a cross brace 37. The cross brace 37 is then connected either directly to the tubular members 30 or first to another cross brace 37 as shown. Each of the mounting ears have a hole for receiving a bolt to tightly connect the upper control arm 40 to the subframe 25.

At least one lower control arm 42 is connected to the subframe 25 by a lower control arm mount 48 shown in FIG. 1. In the preferred embodiments, there are a pair of lower control mounts 48 that are formed from dual mounting ears. The mounting ears are preferably welded to intermediate tubes 38 which are in turn connected to the cross braces 37 which connect to the tubular members 30. Each of the mounting ears has a hole for receiving a bolt to tightly connect the control arm 42 to the subframe 25.

Figure 7:
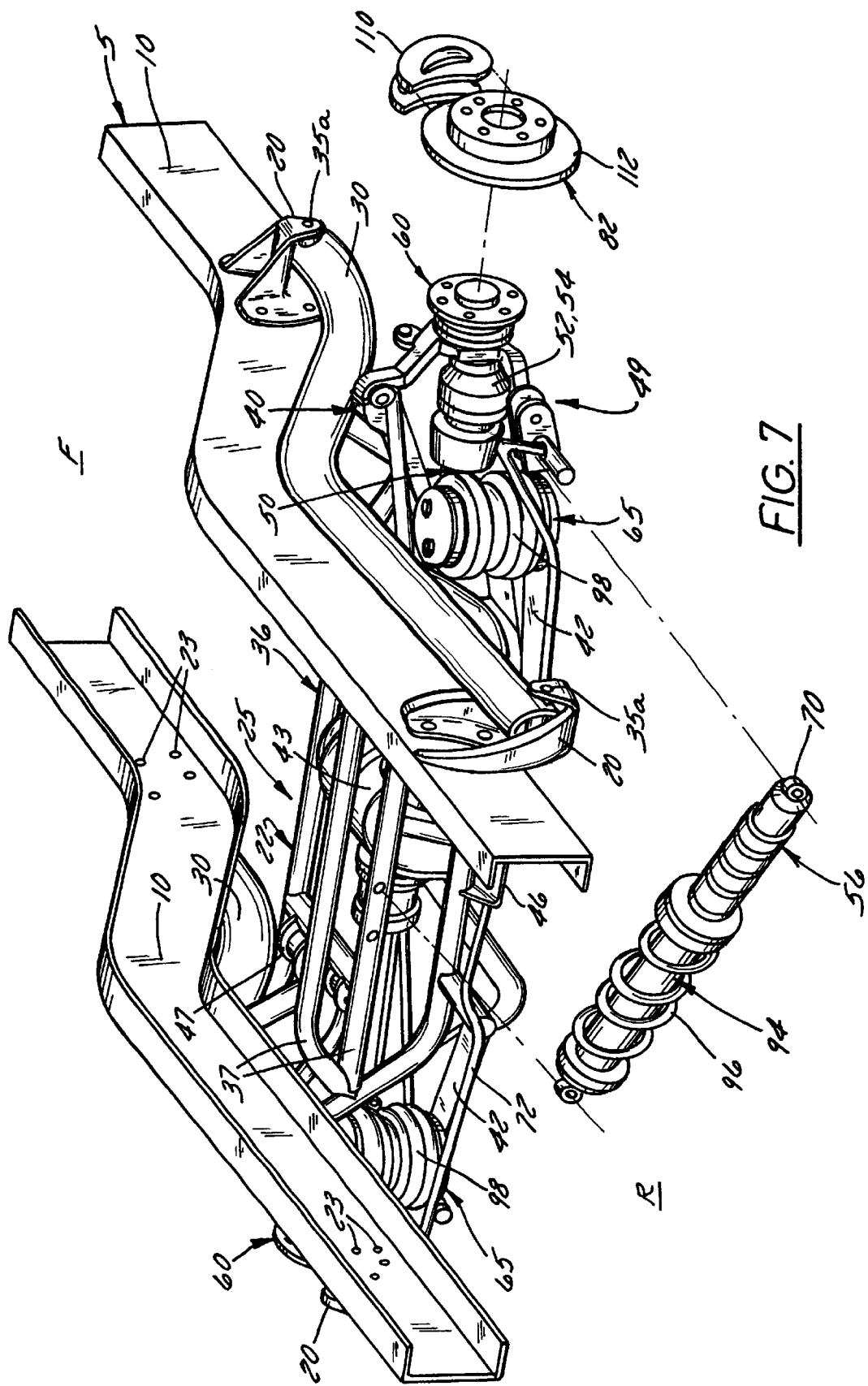
FIG. 7 is an isometric view looking from rear to front of the suspension system of FIG. 1.

As shown in FIG. 7, the upper 40 and lower control arms 42 are preferably constructed from a cast or forged alloy tubular member having about a 1.25" diameter and are anchored by tube sections having approximately a 1" diameter. Stock bushings (not shown) and ball joints (not shown) are incorporated, where applicable, with both the upper and lower control arms 40, 42 to ensure smooth operation.

Figure 8:
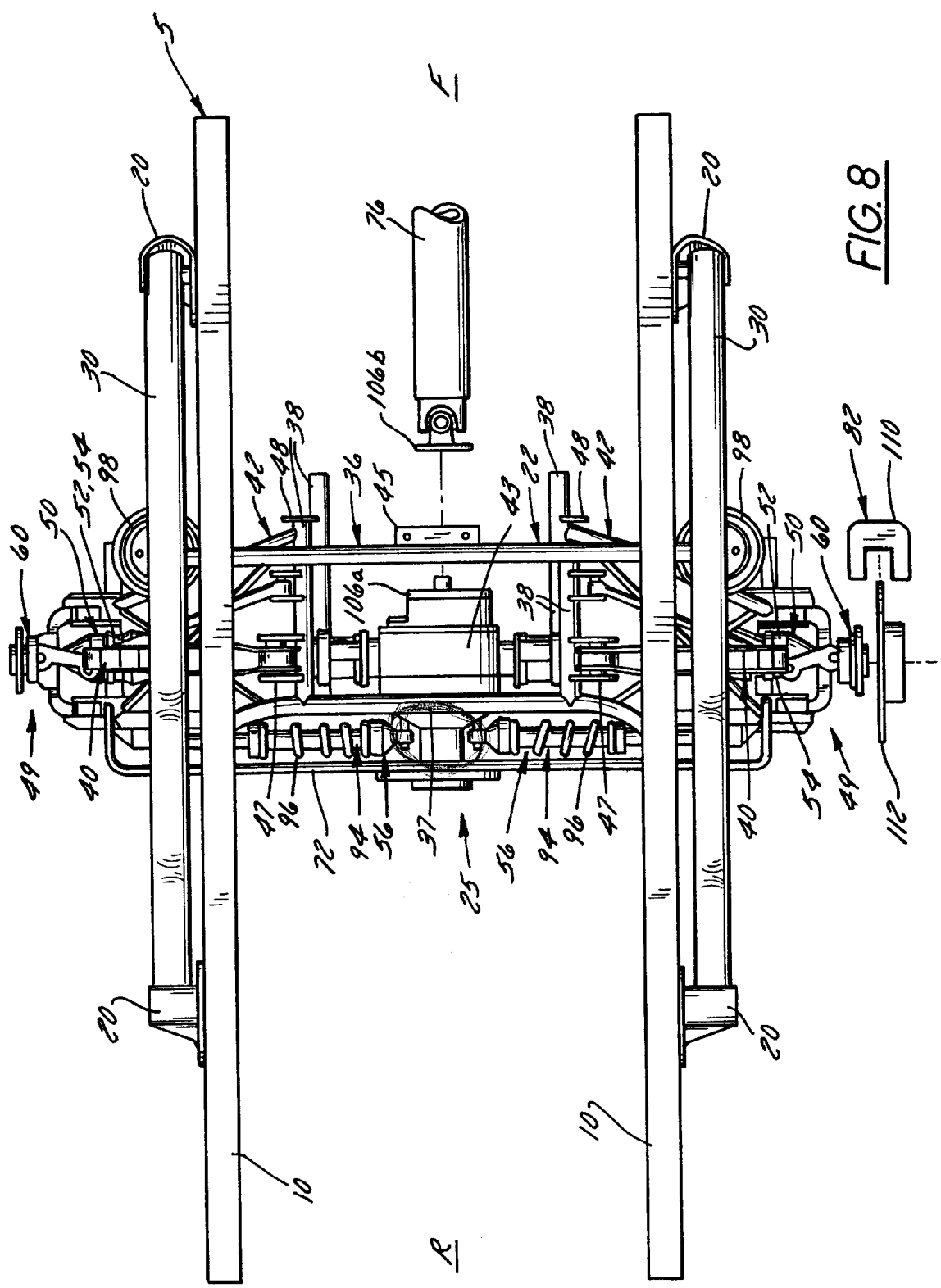
FIG. 8 is a top view of the suspension system of FIG. 1.
Figure 9:
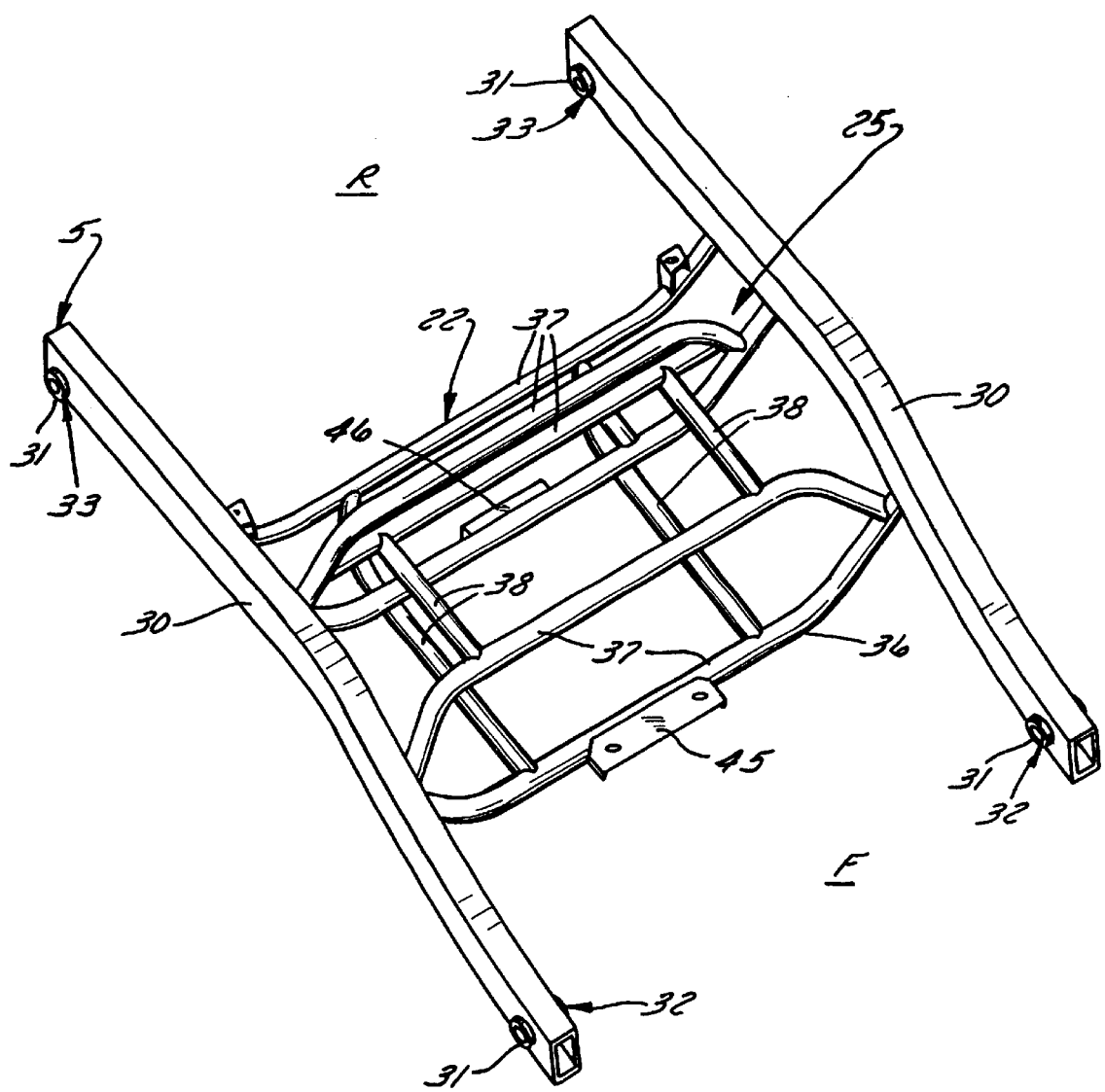
FIG. 9 is a perspective view of an alternate embodiment.

As shown in FIG. 8, a pair of half-axle shafts 50 are connected on either side of the differential 43. The half-axle shafts 50 help translate torque from the motor to the differential 43 to the wheels (not shown) as is well known in the art. As shown in FIG. 7, a constant velocity (cv) joint 52 is connected to each half-axle shaft 50 and is covered a cv boot 54. A spindle assembly 60 connects to each cv joint 52. In some applications, a U-joint (not shown) replaces a cv joint.

A suspension assembly 49 is operably associated with the subframe 25 by connecting to the half-axle shafts to provide suspension, and to thereby restrict movement of the half-axle shafts. In the preferred embodiments, an adjustable cushioning assembly 56 may be connected to the half axle shafts 50 by first connecting to the lower control arms 48 (although one skilled in the art would realize other connection arrangements are possible). In FIG. 7, the adjustable cushioning assembly includes an air cushioning system 65 which is shown in a rear mount position. The air cushioning system 65 may also be front mounted.

The air cushioning system 65 may be included so that the vehicle's user can either manually by an air hose or automatically by a built-in compressor adjust the suspension system 22 according the vehicle's load as found in FIG. 7. In prior art systems, the vehicle's user was forced to live with the stiff, rough riding, truck leaf spring suspension that came with the vehicle from the OEM. By using the adjustable air cushioning system 65, the user can manipulate the suspension system to get a stiff suspension for heavy loads or a more forgiving suspension for passenger comfort. One skilled in the art will realize that the medium that allows for adjustment of the air cushioning system 65 may be of a liquid, solid, gas, or combination thereof, and is therefore not merely limited to air.

As shown in FIG. 7, the cushioning assembly 56 in the preferred embodiments, include a coil-over-shock assembly 94 which is made up of an air spring 98, coil spring 96, and a shock absorber 70. This coil-over-shock assembly 94 and/or air spring takes over the stabilizing function of a torsion bar, eliminating the complexity and extra parts a torsion bar would require.

In other possible embodiments (not shown), the cushioning assembly 56 may use various configurations of push rod/rocker arm activated coil-over shocks and/or air springs.

The shock and/or push rod mount(s) to the lower control arm. In the case of a push rod, the system pivots on a rocker, pushing against the shock to its anchor.

As shown in FIG. 7, in the preferred embodiments, an anti-roll bar 72 connects from lower control arms 42 to the subframe 25. The anti-roll bar 72 may be either in either a bar style (as shown) or an adjustable tube/blade configuration (race style). The anti-roll bar 72 helps stabilize the vehicle by counter-balancing the affects of weight-transfer when the vehicle enters a turn. Therefore, the anti-roll bar 72 helps prevent a vehicle roll-over from occurring. Roll-overs often occur in sport utility vehicles and trucks because these vehicles sit relatively high off the ground and have a displaced center of gravity. A spindle/knuckle (not shown) may mount to the control arms 42 via bushings (not shown). Drive shafts or half-axle shafts 50 mount from the differential 43 to the drive flange or spindle assembly 60 on a knuckle (not shown) utilizing universal or U-joints (not shown).

As shown in FIGS. 7 and 8, the preferred embodiments also include a disc brake system 82 operably associated with the subframe 25. The disc brake system 82 has calipers 110, rotors 112, and associated hardware for upgrading the rear brakes. In the present invention system, a disc brake system 82 fits the vehicle chassis 5 more closely and tightly than standard drum brake systems. Further, the disc brake system 82 provides far superior performance. For the high performance embodiment, high performance disc brakes, such as those found on a 1997 DODGE® VIPER® model car may be supplied. The standard 4×4 model may have either disc brakes for a 1997 FORD® THUNDERBIRD® model car or those made by after-market groups. The brake system 82 mounts to the steering knuckle and the rotors 112 will mount to the drive flange or spindle assembly 60 opposite the U-joints or cv joints (not shown) as is well known in the art. Tires and wheels (not shown) mount to the drive flange via lug studs (not shown).

The standard embodiment differential, half-shafts, main drive shaft, knuckle/drive hub assembly, rear toe adjustment, and brake system may be over-the-counter, stock, or 1997 FORD® THUNDERBIRD® model car components. The high performance embodiment may incorporate a high performance kit, including differential, brake system, and the spindles/steering knuckle such as these used on the 1997 DODGE® VIPER® model car. The 4×4 model may use a 9 inch, 8.8 inch, or DANA® 44, 60, or 70 series gear differential, like those found on 1997 FORD® trucks.

When installing for use, the inventive vehicle suspension system 22 is a complete system which is self-contained and free-standing. For example, the subframe 25 and all of the moving components in the suspension system 49 including the shock absorbers, upper and lower control arms 40,42, links (not shown), differential 43, half-axle shafts 50, adjustable cushioning assembly 56, and adjacent parts, as well as the shock mounting areas, suspension pick-up points, and rear end carrier all act and are equipped as a unitary system. The system 22 is also pre-calibrated so that it can be "dropped in" to the vehicle without having to make any major adjustments to it before the vehicle will ride properly. No calculating or measuring of rolls or droop angles is necessary. Because the inventive suspension 22 fits into the existing leaf spring mounting perches 20, it mounts in near perfect precision every time, unlike most prior art systems that involve additional cutting, welding, or drilling. The inventive suspension system 22 was designed so that an amateur mechanic could install it with an ordinary wrench in generally a matter of hours, climb into the vehicle, and drive away without experiencing problems. Most of the prior art systems are not free-standing, self-contained and functional on their own in that they need additional parts to function properly. Further, while most prior IRS systems involve a tremendous amount of design work and fabrication, the IRS system of the present invention takes all of the guesswork and time out of the installation because it is pre-calibrated for specific makes and models.

Referring to FIG. 1, the mounting procedure generally is this: raise the vehicle, preferably on a hoist, disconnect drive shaft 76 from differential 43, disconnect brake lines (not shown), and unbolt the leaf springs (not shown) from the chassis 5. Fundamentally, most prior art rear suspension assemblies have about four bolts attaching them to the chassis 5, so it is relatively simple to remove the old suspension system and install the suspension system 22 of the present invention. The present invention system 22 consists of a complete suspension: a subframe 25, upper and lower control arms 40, 42, differential 43, half-axle shafts 50, shocks 70, springs 96, and disc brake system 82. Therefore, the IRS system 22 of the present invention is compete, with nothing more which needs mounting other than the connection to the differential 43. To install the IRS system 22 of the present invention, it is necessary to bolt it with bolts 35a to at least one of the leaf spring perches 20 which are mounted to the rails 10. Next, attach the drive shaft 76 by connecting the drive shaft drive flanges 106a and 106b. Finally, reconnect the brake lines and configure the brakes 82. This can be accomplished easily in any garage, with ordinary tools.

The present invention has been described in terms of the preferred embodiments, however, it is recognized that equivalents, alternatives, and modifications, aside from those expressly stated, are possible and within the scope of the invention and appending claims.

We claim:

1. A vehicle suspension system for mounting to a vehicle chassis having a pair of chassis rails, the system comprising:
   a substantially rigid suspension subframe that includes a pair of spaced apart and longitudinally extending tubular subframe rails and
   a differential carried by the subframe;
   a pair of half-axle shafts connected to the differential;
   at least one first fastener that attaches one of the subframe rails to one of the chassis rails and at least one second fastener that attaches the other one of the subframe rails to the other one of the chassis rails;
   wherein the subframe further comprises a plurality of tubular cross braces connected between the tubular subframe rails; and a plurality of longitudinally extending and tubular intermediate tubes connected between the cross braces; and
   a spindle assembly connected to each half-axle shaft;
   at least one upper control arm mounted at one end to one intermediate tube of the subframe at an upper control arm mount on the one intermediate tube and at the other end to the spindle assembly; and
   at least one lower control arm mounted at one end to another intermediate tube of the subframe at a lower control arm mount on the another intermediate tube and at the other end to the spindle assembly.

2. The vehicle suspension system of claim 1, further comprising:
   a differential mount attached to one of the cross braces.

3. The suspension system of claim 2, further comprising:
   wherein the differential is mounted to the one of the cross braces at the differential mount;
   a constant velocity joint connected to each half-axle shaft;
   a constant velocity boot for covering each constant velocity joint;
   one of the spindle assemblies connected to each constant velocity joint; and
   a disc brake system connected to the spindle assemblies.

4. The vehicle suspension system of claim 3, further comprising an adjustable cushioning assembly connected to at least one of the half-axle shafts at one end for restricting movement of the half-axle shafts.

5. The vehicle suspension system of claim 1, wherein the subframe further comprises an anti-roll bar connected to the subframe.

6. The vehicle suspension system of claim 1, further comprising a suspension assembly operably associated with the subframe.

7. The vehicle suspension system of claim 5, wherein the subframe further comprises an internal subframe.

8. The suspension system of claim 1, wherein the cross braces and the intermediate tubes are comprised of a metal matrix alloy.

9. A vehicle suspension system for mounting to a vehicle chassis having a pair of chassis rails, the system comprising:
   a substantially rigid suspension subframe that includes a pair of spaced apart and longitudinally extending tubular subframe rails and a transversely extending cross brace that extends from one tubular subframe rail to the other tubular subframe rail;
   a differential carried by the subframe;
   a pair of half-axle shafts connected to the differential; and
   at least one first fastener that attaches one of the subframe rails to one of the chassis rails and at least one second fastener that attaches the other one of the subframe rails to the other one of the chassis rails,
   wherein each one of the tubular subframe rails has at least one hole at one end with at least one tube inserted therein for mounting each tubular subframe rail to one of the vehicle chassis rails.

10. The vehicle suspension system of claim 9, further including a plurality of coil-over-shock assemblies that are each operably connected to one of the half-axle shafts at one end and connected to the subframe at another end.

11. A vehicle having a front and a rear comprising:
    a chassis including a pair of uniformly spaced apart rails that run longitudinally from adjacent the front of the vehicle toward the rear of the vehicle;
    at least one mount in cooperation with each rail;
    a tubular, cage-like subframe connected to the mount of each rail for providing suspension to the vehicle; and
    wherein the subframe has a hole at the mount and a tube rigidly connected within the hole for use in mounting the subframe to the rails.

12. The subframe of claim 11, further comprising a disc brake system connected to the subframe; and an adjustable cushioning assembly connected to the subframe.

13. The subframe of claim 11, further comprising an adjustable cushioning assembly connected to the subframe.

14. The subframe of claim 11, wherein the subframe is constructed to follow the contour of the chassis and to mount to the side of the rails.

15. The subframe of claim 11 further comprising a pair of control arm assemblies that include an upper control arm and a lower control arm pivotally operably connected to the subframe, a differential carried by the tubular subframe, a pair of shafts that extend generally horizontally outwardly from the differential generally perpendicularly relative to the rails of the chassis and which are each operably connected to a vehicle wheel, a pair of spaced apart springs captured by the frame, and a pair of cushioning elements each having one end pivotally mounted to the subframe inboard one of the rails of the chassis and another end pivotally mounted to one of the control arms outboard of the one of the rails.

16. The subframe of claim 11, wherein the subframe includes a plurality of spaced apart tubular members, with one of the tubular members disposed alongside one of the rails and attached to the mount of the one of the rails and the other of the tubular member disposed alongside the other of the and attached to the mount of the other of the rails.

17. The vehicle of claim 11, further comprising a pair of shocks mounted at one end toward a top of the subframe and mounted at another end toward a bottom of the subframe.

18. The vehicle of claim 11, wherein the subframe is mounted to the sides of the rails.

19. The vehicle of claim 11, wherein the subframe includes: a pair of parallel tubular members; a plurality of cross braces welded to the parallel tubular members; and a plurality of intermediate tubes welded to the cross braces.

20. A vehicle independent rear suspension system for mounting to vehicle chassis rails having leaf spring mounting perches comprising:
  a subframe for converting a leaf spring suspension system to an independent rear suspension system;
  the subframe including two parallel tubular members, each member having a rear mount and a front mount for connecting the members to the rail;
  at least four tubular cross braces connected to the tubular members;
  a differential mount integral with at least one cross brace;
  at least four intermediate tubes parallel to the tubular members and connected to the cross braces forming a cage-like structure; and
  at least one control arm mount attached to at least one intermediate tube.

21. The suspension system of claim 20, wherein the tubular members are constructed of generally square tube.

22. The suspension system of claim 20, further comprising a cushioning assembly mounted within the subframe.

23. The suspension system of claim 20, wherein the subframe mounts to the rails by only four bolts.

24. An independent vehicle suspension for a vehicle with a chassis comprising:
  (a) a tubular suspension subframe that is mountable to the vehicle chassis, the tubular suspension subframe including a plurality of spaced apart and longitudinally extending tubular frame rails, a plurality of spaced apart and tubular cross braces that each extend from one of the plurality of tubular frame rails to another one of the plurality of tubular frame rails, and a plurality of spaced apart and generally longitudinally extending tubular intermediate tubes disposed inboard of the frame rails that each extend from one of the tubular cross braces to another one of the tubular cross braces;
  (b) a plurality of spaced apart control arms pivotally mounted to the suspension subframe with one of the control arms pivotally mounted to one of the intermediate tubes and another one of the control arms pivotally mounted to another one of the intermediate tubes wherein each control arm extends in a generally transverse direction outwardly from the suspension subframe with one of the control arms extending generally transversely in one direction and another one of the control arms extending generally transversely in an another direction;
  (c) a generally transversely extending axle carried by the suspension subframe; and
  (d) a first spindle assembly operably attached to the one of the control arms and the axle and a second spindle assembly operably attached to the another one of the control arms and the axle.

25. The independent vehicle suspension according to claim 24 wherein the tubular subframe includes a first pair of tubular cross braces disposed forwardly of the axle with one of the forwardly disposed tubular cross braces extending from one of the tubular frame rails to another one of the tubular frame rails, a second pair of tubular cross braces disposed rearwardly of the axle with one of the rearwardly disposed tubular cross braces extending from one of the tubular frame rails to another one of the tubular frame rails, a differential mounted to the tubular subframe, and wherein the axle extends from the differential with one end of the axle extending outwardly from the differential toward one of the plurality of tubular frame rails and another end of the axle extending outwardly from the differential toward another one of the plurality of tubular frame rails.

26. The independent vehicle suspension according to claim 25 wherein the subframe is attached to the chassis adjacent the rear of the vehicle, wherein the chassis is comprised of a plurality of spaced apart and longitudinally extending chassis rails, and wherein one of the plurality of tubular frame rails is mounted to one of the chassis rails and another one of the plurality of tubular frame rails is mounted to another one of the chassis rails.

27. The independent vehicle suspension according to claim 26 wherein chassis rails each further comprise a plurality of spaced apart and preexisting suspension mounts, and wherein the tubular frame rails that are mounted to the chassis rails are disposed outboard of the chassis rails and mounted to the preexisting mounts.

28. The independent vehicle suspension according to claim 24 further comprising a pair of spaced apart cushioning assemblies.

29. The independent suspension according to claim 28 wherein each cushioning assembly comprises a coil spring and a shock absorber disposed in the coil spring.

30. The independent vehicle suspension according to claim 28 wherein each cushioning assembly is generally transversely disposed.

31. The independent vehicle suspension according claim 24 wherein the suspension is of multilink construction.

32. The independent vehicle suspension according to claim 31 further comprising a pair of generally transversely disposed and spaced apart cushioning assemblies.

33. The independent suspension according to claim 32 wherein each cushioning assembly comprises a coil spring and a shock absorber disposed in the coil spring.

34. The independent suspension according to claim 24 further comprising a differential, wherein the tubular suspension subframe further comprises a tubular cage to which the differential is mounted, and wherein the axle comprises a pair of half axle shafts that both extend outwardly from the differential.

35. The independent suspension according to claim 34 further comprising a pair of spaced apart coil over shock assemblies that each has a pair of ends that is mountable to a part of the independent suspension and wherein the tubular suspension subframe is mountable by a plurality of fasteners to preexisting mounts on the vehicle chassis.

36. The independent suspension according to claim 35 wherein each preexisting mount comprises a leaf spring perch.

37. An independent vehicle suspension for a vehicle with a chassis comprising:
    (a) a tubular suspension subframe mountable to the vehicle chassis;
    (b) a plurality of spaced apart control arms pivotally mounted to the suspension subframe wherein each control arm extends in a generally transverse direction outwardly from the suspension subframe with one of the control arms extending generally transversely outwardly from the suspension subframe in one direction and another one of the control arms extending generally transversely outwardly from the suspension subframe in an another direction;
    (c) a generally transversely extending axle carried by the suspension subframe; and
    (d) a first spindle assembly operably attached to the one of the control arms and the axle and a second spindle assembly operably attached to the another one of the control arms and the axle,
        wherein the tubular subframe is comprised of (1) a plurality of spaced apart and generally transversely extending tubular cross braces and (2) a plurality of spaced apart and generally longitudinally extending tubular intermediate tubes; and
        further comprising a pair of spaced apart and longitudinally extending tubular subframe rails that each attach to the vehicle chassis wherein each one of the tubular cross braces extends form one of the tubular subframe rails to the other one of the tubular subframe rails.

38. The independent vehicle suspension according to claim 37 wherein the tubular subframe rails and the tubular subframe are of bolt-on construction and the tubular subframe rails are mountable to the vehicle chassis by bolts.

39. The independent vehicle suspension according to claim 37 wherein the vehicle chassis further comprises two pair of leaf spring perches with one pair of leaf spring perches being disposed along one side of the vehicle chassis and the other pair of leaf spring perches being disposed along another side of the vehicle chassis and wherein one of the tubular subframe rails is mountable to one pair of the leaf spring perches and the other one of the tubular subframe rails is mountable to the other pair of the leaf spring perches.

40. The independent vehicle suspension according to claim 39 wherein the tubular subframe rails and the tubular subframe are of bolt-on construction and the tubular subframe rails are mountable to the vehicle chassis by bolts.

41. An independent rear suspension for a vehicle having a chassis comprising:
    (a) a tubular suspension subframe that includes a tubular cage, the tubular suspension subframe attachable to the vehicle chassis, wherein the tubular cage comprises a pair of tubular cross braces that extend transversely relative to the vehicle and a pair of tubular intermediate tubes that extend longitudinally relative to the vehicle;
    (b) a differential that is mounted to the cage;
    (c) a pair of control arms pivotally mounted to the tubular suspension subframe with one of the control arms extending outwardly in one direction and the other one of the control arms extending outwardly generally in an opposite direction;
    (d) a first half axle shaft extending outwardly from the differential in one direction;
    (e) a second half axle shaft extending outwardly from the differential generally in an opposite direction;
    (f) a first cushioning assembly operably attached to one of the control arms;
    (g) a second cushioning assembly operably attached to the other one of the control arms; and
    (h) a fore differential mounting plate attached to one of the tubular cross braces and an aft differential mounting plate attached to another one of the tubular cross braces.

42. The independent rear suspension according to claim 41 wherein the independent rear suspension is of multilink construction.

43. The independent rear suspension according to claim 42 wherein the pair of control arms comprises a pair of upper control arms and further comprising a pair of lower control arms and wherein each half-axle shaft further comprises a constant velocity joint.

44. The independent rear suspension according to claim 43 further comprising a pair of spindle assemblies with one of the spindle assemblies attached to one of the upper control arms and one of the lower control arms and the other one of the spindle assemblies attached to the other one of the upper control arms and the other one of the lower control arms and further comprising a pair of disc brake assemblies with one of the disc brake assemblies attached to one of the spindle assemblies and the other one of the disc brake assemblies attached to the other one of the spindle assemblies.

45. An independent rear suspension that is mountable to a chassis of a vehicle comprising:
    (a) a tubular suspension frame that is mountable to the vehicle chassis, the tubular suspension frame comprising a plurality of hollow cross brace tubes that each extend transversely relative to the vehicle and a plurality of hollow intermediate tubes that each extend longitudinally relative to the vehicle;
    (b) a differential mounted to a plurality of the tubes, the differential attached to a plurality of half axle shafts with each one of the half axle shafts comprising a constant velocity joint;
    (c) a pair of upper control arms with one of the upper control arms pivotally mounted to one of the hollow intermediate tubes and the other one of the upper control arms pivotally mounted to another one of the hollow intermediate tube); and
    (d) a pair of spindle assemblies with one of the spindle assemblies operably attached to one of the upper control arms and one of the half axle shafts and the other one of the spindles assemblies operably attached to the other one of the upper control arms and the other one of the half axle shafts.

46. An independent rear suspension according to claim 45 wherein the independent rear suspension is of multilink construction and at least one of the tubes has an oval cross section.

47. A rear vehicle suspension system for mounting to a vehicle chassis having a pair of chassis rails, the system comprising:
    a substantially rigid suspension subframe that includes a pair of spaced apart and longitudinally extending subframe rails, a plurality of tubular cross braces connecting the subframe rails, and a plurality of longitudinally extending and tubular intermediate tubes connecting the plurality of cross braces;

a differential carried by the subframe;

a pair of half-axle shafts extending outwardly from the differential;

at least one fastener that attaches one of the subframe rails to one of the chassis rails and at least one fastener that attaches the other one of the subframe rails to the other one of the chassis rails;

a spindle assembly that is operatively connected to each half-axle shaft with each spindle assembly having a rotatable spindle;

at least one upper control arm mounted at one end to one intermediate tube of the subframe and mounted at the other end to the spindle assembly;

at least one lower control arm mounted at one end to another intermediate tube of the subframe and at the other end to the spindle assembly; and a first constant velocity joint connected to one of the half-axle shafts and connected to the rotatable spindle of one of the spindle assemblies and a second constant velocity joint connected to the other one of the half-axle shafts and connected to the rotatable spindle of the other one of the spindle assemblies.

48. The rear suspension system according to claim 47 further comprising a disc brake assembly attached to each one of the spindle assemblies.

49. An independent rear suspension that is mountable to a chassis of a vehicle comprising:

(a) a tubular suspension frame that is mountable to the vehicle chassis, the tubular suspension frame comprising a plurality of hollow cross brace tubes that each extend transversely relative to the vehicle and a plurality of hollow intermediate tubes that each extend longitudinally relative to the vehicle;

(b) a differential carried by the tubular suspension frame, the differential attached to a plurality of half-axle shafts with each half-axle shaft carrying a constant velocity joint;

(c) a pair of upper control arms with one of the upper control arms pivotally mounted to one of the hollow intermediate tubes and the other one of the upper control arms pivotally mounted to another one of the hollow intermediate tubes;

(d) a pair of spindle assemblies that each includes a rotatable spindle with one of the spindle assemblies operably attached to one of the upper control arms and its spindle attached to one of the half axle shafts and the other one of the spindle assemblies operably attached to the other one of the upper control arms and its spindle attached to the other one of the half axle shafts; and (e) a pair of disc brake assemblies that each includes a rotor with the rotor of one of the disc brake assemblies attached to the spindle of one of the spindle assemblies and the rotor of the other one of the disc brake assemblies attached to the spindle of the other one of the spindle assemblies.

50. The independent rear suspension according to claim 49 further comprising a pair of lower control arms with one of the lower control arms mounted to the tubular suspension frame and mounted to one of the spindle assemblies and the other one of the lower control arms mounted to the tubular suspension frame and to the other one of the spindle assemblies.

* * * * *